United States Patent [19]

Taguchi

[11] Patent Number: 4,914,702
[45] Date of Patent: Apr. 3, 1990

[54] FORMANT PATTERN MATCHING VOCODER

[75] Inventor: Tetsu Taguchi, Tokyo, Japan
[73] Assignee: NEC Corporation, Tokyo, Japan
[21] Appl. No.: 881,744
[22] Filed: Jul. 3, 1986
[30] Foreign Application Priority Data
Jul. 3, 1985 [JP] Japan ................................. 60-147262
[51] Int. Cl.$^4$ ............................................... G10L 9/02
[52] U.S. Cl. ..................................................... 381/39
[58] Field of Search ................................. 381/41-45, 381/50, 36-40, 51, 29-32; 364/513.5

[56] References Cited

U.S. PATENT DOCUMENTS

| | | | |
|---|---|---|---|
| 4,301,329 | 11/1981 | Taguchi | 381/36 |
| 4,346,262 | 8/1982 | Willems et al. | 381/50 |
| 4,661,915 | 4/1987 | Ott | 364/513.5 |
| 4,669,120 | 5/1987 | Ono | 381/40 |
| 4,701,955 | 10/1987 | Taguchi | 381/51 |
| 4,715,004 | 12/1987 | Kabasawa et al. | 364/513.5 |

OTHER PUBLICATIONS

Rabiner et al., "Digital Processing of Speech Signals", Prentice-Hall, 1978, pp. 42-45.
Reddy et al., "Use of Segmentation and Labeling in Analysis-Sythesis of Speech", ICASSP 77, pp. 28-32.

*Primary Examiner*—David L. Clark
*Assistant Examiner*—John A. Merecki
*Attorney, Agent, or Firm*—Sughrue, Mion, Zinn, Macpeak & Seas

[57] ABSTRACT

A vocoder for matching an input speech signal with a reference speech signal on the basis of mutual angular data developed through spherical coordinate conversion of a plurality of formant frequencies obtained from the input and reference speech signals.

11 Claims, 3 Drawing Sheets

FORMANT PATTERN MATCHING VOCODER

BACKGROUND OF THE INVENTION

This invention relates to a formant pattern matching vocoder for analyzing and synthesizing an input speeh signal by pattern matching making use of formant information.

A pattern matching vocoder is well known as an effective means for compressing speech information to be transmitted. In a pattern matching vocoder, the most similar reference pattern is selected by matching (comparing) the spectrum envelope of the input speech with those of reference patterns previously registered, and a label indicating the most similar reference pattern is transmitted from the analysis side to the synthesis side. Usually, an α parameter or a K parameter of an LPC (Linear Prediction Coding) coefficient or various coefficients derived therefrom are utilitzed as the information representing the spectrum envelope.

This pattern matching vocoder, however, is disadvantageous in that the number of speakers available for the traning or registration for making the reference patterns is limited due to economic and other reasons. It is very difficult to make reference patterns suitable for any person, by clustering the training data obtained from the limited number of speakers. This indicates that making the reference patterns applicable to all unspecified speakers is impossible on the basis of the data spoken by even several tens of speakers. The difference in the spectral distribution for the speakers is attributed to the fact that each speaker has his own vocal tract characteristics and vocal cord sound source characteristics. The difference in the vocal tract characteristics, which is caused by the difference in the length of the vocal tract, causes a change in the formant frequency which is a point of resonance in the vocal tract. On the other hand, the difference in the vocal cord sound source characteristics causes a change in the gradient of the spectrum envelope. In order to perform a pattern matching suitable for any person, therefore, it is necessary to normalize the vocal tract characteristics and the vocal cord sound source characteristics by suitable measures, or to eliminate their influences.

In conventional pattern matching vocoder, however, the pattern matching is conducted through spectral envelope parameter(s) extracted by LPC analysis. The LPC analysis is based on the extraction of the spectral envelope paramenter on the assumption that the vocal tract characteristics, which are not actually flat, are flat. Namely, the spectral envelope parameter is extracted as a convolution of the vocal tract characteristics which vary depending on the speaker, and vocal cord sound source characteristics which are regareded as being flat.

In order to effect a pattern matching which can easily be adapted to any person, it is necessary to separate the voice tract characteristics and the voice cord sound source characteristics from each other and to form a spectral distribution through normalizing both characteristics or by eliminating the speaker-dependencies of these characteristics. Unfortunately, however, this fact has not been taken into consideration in the design of conventional pattern matching systems.

SUMMARY OF THE INVENTION

An object of the present invention is thus to provide a formant pattern matching vocoder easily adaptable to any speaker and according to the present invention, a formant pattern matching vocoder comprises first means for developing a plurality of formant frequencies from an input speech signal, sceond means for performing spherical coordinate conversion of the formant frequencies and developing mutual angular data for the sherical coordinate converted data; third means for storing the mutual angular data of the formant frequency data of previously prepared speech signals; and fourth means for comparing the output data from the second means with the output data from the third means.

BRIEF DESCRIPTION OF THE DRAWINGS

and

DETAILED DESCRIPTION OF THE PREFERRED EMBODIMENTS

Figure 1:
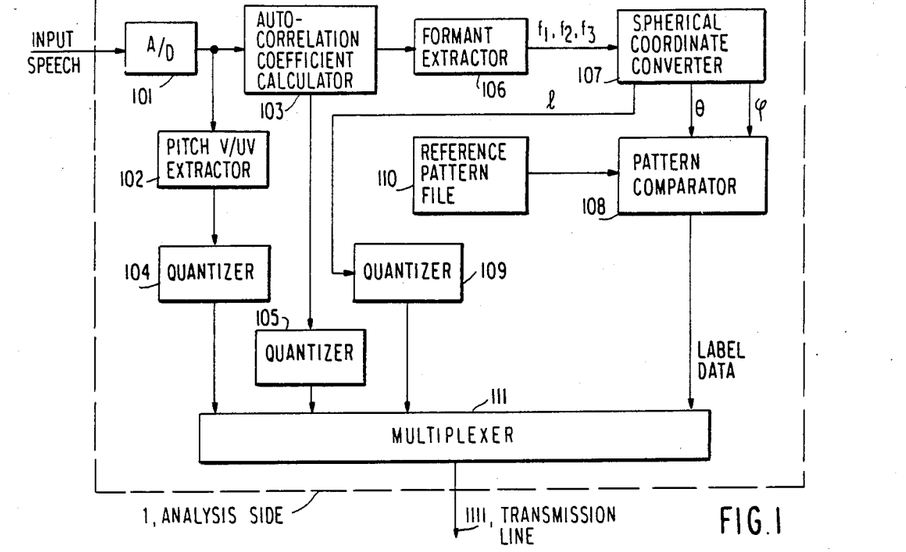
FIG. 1 is a block diagram of an example of the analyzing section of the formant pattern matching vocoder embodying the present invention.

The analyzing section 1 shown in FIG. 1 includes an A/D convcerter 101, a pitch V/UV extractor 102, an auto-correlation coefficient calculator 103, quantizers 104, 105, a formant extractor 106, a spherical coordinate conventer 107, a pattern comparator 108, a quantizer 109, a reference pattern file 110 and a multiplexer 11. The synthesizing section 2 shown in FIG. 2 has a demultiplexer 201, decoders 202, 203, 204, a pattern reader 205, a pitch frequency generator 206, a noise generator 207, a change-over device 208, a multiploier 209, a reference pattern file 210, an orthogonal coordinate converter 211, a formant synthesizer 212, and a D/A converter 213.

In the analyzing section shown in FIG. 1, an input speech signal is delivered to the A/D converter 101 and, after cutting off of unnecessary high-frequency components in an LPF (Low Pass Filter), sampled at a predetermined frequency followed by quantization into a predetermined number of bits. In the illustrated embodiment, the sampling frequency is 8 KHz, while the bit number is 12.

The quantized signals are temporarily stored in an internal memory for each time window which is, for example, 30 mSEC corresponding to 240 samples. A weight multiplication of the stored quantized signals by the window function such as a Humming function or a rectangular function is conducted at a predetermined period, e.g., every 20mSEC. This is the frame analyzing period. Thus, the quantized signals are read out at this frame analysis period and are delivered to the pitch V/UV (Voice/Unvoice) extractor 102 and the auto-correlation coefficient calculator 103.

The pitch V/UV extractor 102 extracts, in accordance with a known extracting techinque, the pitch period and the data concerning V/UV discrimination, and delivers it to the quantizer 104. The latter quantizes the input in accordance with a predetermined manner and supplies it to the multiplexer 111.

The auto-correlation coefficient calculator 103 is adapted to extract the auto-correlation coefficient within the range of a necessary time delay for the quantized signals of each frame, up to a predetermined number of degrees which is 12 in the described embodiment. The thus extrated auto-correlation coefficient is supplied to the formant extractor 106, while delivering, as a short-time mean power, the auto-correlation coefficient at zero delay time to the quantizer 105. The shory-time mean power thus quantized is delivered to the multplexer 111 to establish the speech level or intensity.

Upon receipt of the auto-correlation coefficient of 12 degrees for each analysis frame, the formant extractor 106 extracts first to third formant frequencies $f_1$, $f_2$, $f_3$ for each analysis frame, in accordance with a known formant extracting method. The extracting method may be an AbS (Analysis by Synthesis) method in an auto-correlating region, which is detailed in the pagers by Katsunobu Fushikida entitled "MULTI-STAGE PRESUMPTION OF FORMANT USING INVERSE FILTERING IN SELF-CORRELATION REGION", S81-41, Conference of Acoustics Society of Japan (Oct. 26, 1981). The reason why the first to third formant frequencies $f_1$, $f_2$, $f_3$ are extracted are that at least three consecutive formant frequencies are necessary for the spherical coordinate conversion in the spherical coordinate converter 107; the fourth or higher degrees of formant frequency are unstable and difficult to use so that three consecutive poles excepting fourth and higher degrees are used. The term "poles" is used in this specification to mean points of vocal resonance which substantially coineide with the formant frequencies.

The distribution of the ratis $f_1:f_2:f_3$ amount the thus determined formant frequencies $f_1$, $f_2$, $f_3$ is substantially constant regardless of the kinds of speech, i.e., regardless of the speaker.

The spherical coordinate converter 107 carries out the spherical coordinate conversion of the first to third formant frequencies $f_1$, $f_2$, $f_3$ which are inputted thereto.

Figures 3, 4:
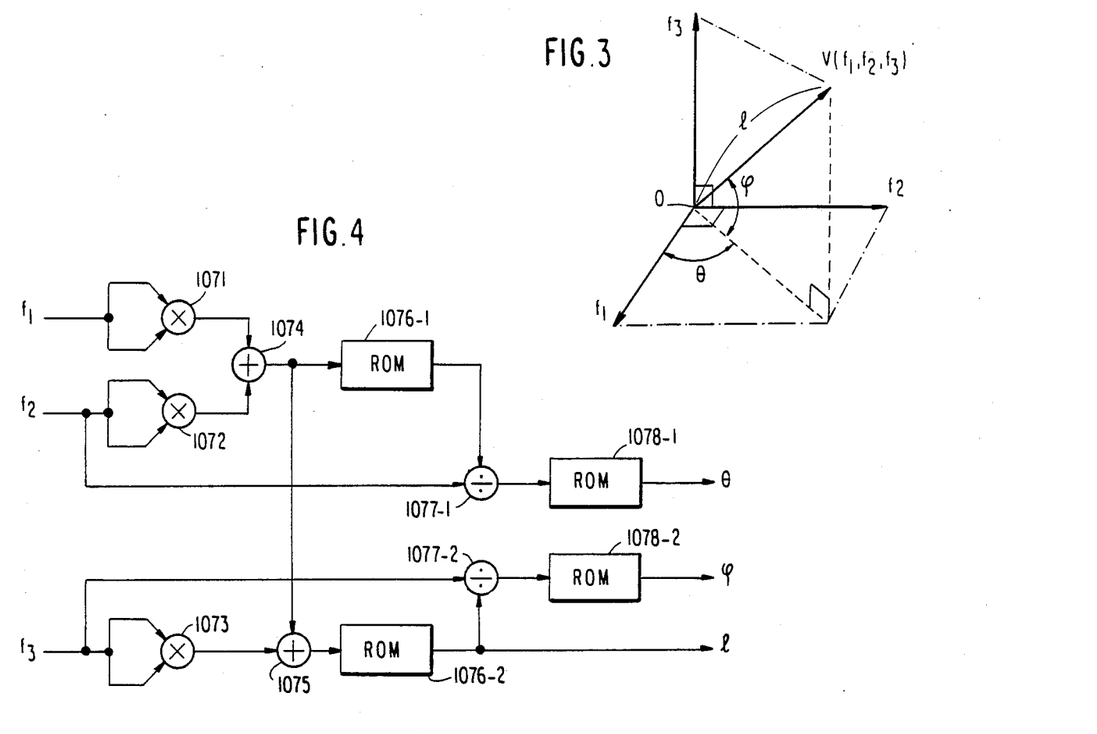
FIG. 3 is an illustration of a three-dimensional spherical coordinate system showing the first to third formant frequencies.
FIG. 4 is a block diagram showing the construction of the spherical coordinate conventer 107 shown in FIG. 1.

FIG. 3 shows the three-dimensional spherical coordinate of the first to third formant frequencies.

The coordinate axes which orthogonally cross at the point of origin respectively represent the formant frequencies $f_1$, $f_2$ and $f_3$, and the three-dimensional synthetic vector V ($f_1$, $f_2$, $f_3$) is defined by the three formant frequencies $f_1$, $f_2$, $f_3$ and two angles $\Theta$ and $\rho$.

FIG. 4 is a block diagram showing the details of the spherical coordinate converter 107, including multipliers 1071, 1072, 1073, adders 1074, 1075, ROMs 1076-1 and 1076-2, dividers 1077-1 and 1077-2, and ROMs 1078-1 and 1078-2.

The pieces of formant frequency data $f_1$, $f_2$, $f_3$ supplied by the fromant extractor 106 are inputted to two terminals of the multipliers 1071, 1072 and 1073 respectively. The formant frequency data $f_2$ and $f_3$ are also inputted to terminals and of the dividers 1077-1 and 1077-2, respectively.

The multipliers 1071, 1072, 1073 output the results $f_1^2$, $f_2^2$, $f_3^2$ of the multiplications to the adders 1074 and 1075. The adder 1074 delivers the sum $f_1^2+f_2^2$ to the ROM 1076-1 and the adder 1075 delivers the sum $f_1^2+f_2^2+f_3^2$ to the ROM 1076-2. These ROMs 1076 contain square root data. More specifically, $\sqrt{x_1}$ is written in the address $x_1$ of the ROMs. That is, the outputs from ROMs 1076-1, 1076-2 are $\sqrt{f_1^2+f_2^2}$ and $\sqrt{f_1^2+f_2^2+f_3^2}$. The output $\sqrt{f_1^2+f_2^2}$ is supplied to the divider input terminal. The output $\sqrt{f_1^2+f_2^2+f_3^3}$ is delivered not only to the divider terminal but also to the quantizer 109 as the data "1".

Obviously, the output $\sqrt{f_1^2+f_2^2+f_3^3}$ is "1" as shown in FIG. 3. The dividers 1077-1, 1077-2 are adapted to output respective quotients $f_2/\sqrt{f_1^2+f_2^2}$ and $f_3/\sqrt{f_1^2+f_2^2+f_3^2}$ to the ROMs 1078-1 and 1078-2 respectively. These ROMs 1078 contain inverse sine function data. That is, $\sin^{-1}(x_2)$ is written in the address $x_2$ of the ROMs. The outputs of the ROMs 1078-1 and 1078-2 are thus "$\Theta$" and "$\rho$" as shown in FIG. 3, which are outputted to the pattern comparator 108.

The thus computed angles $\Theta$ and are two peces of angular relation information among three formant frequencies. From another point of view, they are pieces of information which represent the frequency spectrum of each analysis frame and which are free from the characteristics peculiar to the speakers, as will be understood from the foregoing description concerning the frequencies $f_1$, $f_2$, $f_3$.

Referring again to FIG. 1, the formant frequencies $f_1$, $f_2$, $f_3$ expressed by the spherical coordinate system as represented by the absolute value 1 of the synthesized vector and the angular relations $\Theta$ and $\rho$ for each frame are inputted to the quantizer 109 and the pattern comparator 108, respectively.

The data 1 supplied to the quantizer 109 is supplied to the multiplexer 111 after a predetermined quantization.

The data $\Theta$, $\rho$ supplied to the pattern comparator 108 are subjected to pattern comparison through measurement of the city block distance or Euclid distance of the data form each of a plurality of reference patterns stored in the file 110, for each of the frames. The described embodiment utilizes the city block distance. Thus, the pattern comparator 108 delivers to the multiplexer 111 pattern label data which minimizes the city block distance.

The reference pattern file 110 is a ROM which stores off-line data concerning $\Theta$ and $\rho$ obtained from speeches of one to several tens of speakers; through analysis performed by the described analyzing section or by a separate computer system, the data being extracted for each analysis frame and clustered to form the reference patterns. The reference pattern file 110 delivers to the pattern comparator 108 the data, i.e., the reference pattern, sorted in the address specified by the address information supplied from the pattern comparator. Needless to say, the label of the reference pattern coincides with this address. The pattern comparator 108 is adapted to conduct the comparison between the reference pattern data supplied by the file 110 and the data $\Theta$, $\rho$ supplied by the spherical coordinat converter 107. This pattern comparison is executed in such a manner as to find any reference pattern which minimizes the city block distance $d_{ik}$ expressed by the following formula:

$$d_{ik} = \min(|\Theta_i^s - \Theta^k| + |\rho_i^s - \rho^k|) \tag{1}$$

In formula (1), $\Theta^k$ and $\rho^k$ represent the angle data received for each frame from spherical coordinate converter 107. The data $\Theta_i^s$ and $\rho_i^s$ are the pattern data stored in the reference pattern file. All of these data are frequency spectrum angle data. Suffixes i indicates numbers 0, 1 . . . ., and n−1. Thus, the number n represents the total number of standard or reference patterns.

Figure 5:
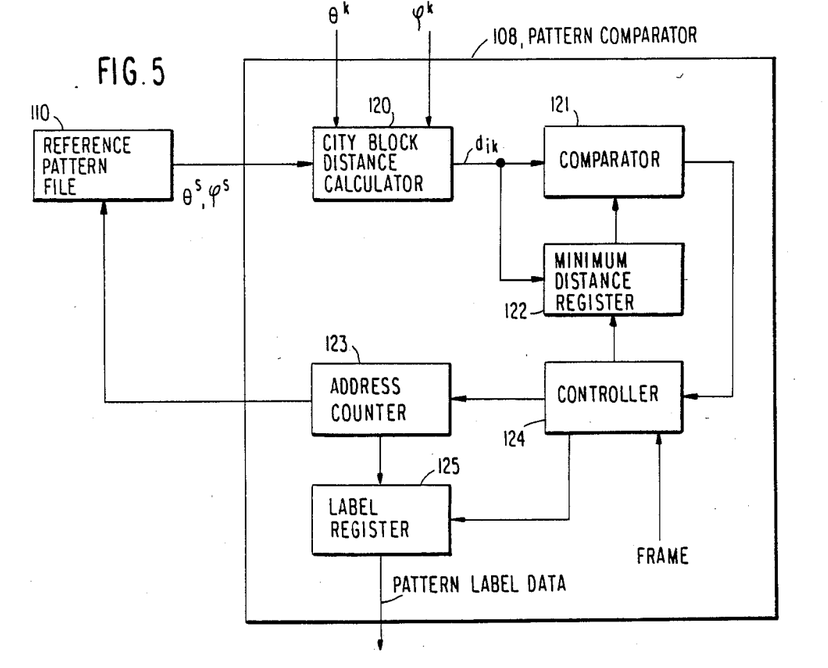
FIG. 5 is a block diagram showing the construction of the pattern comparator 108 shown in FIG. 1.

The pattern comparator 108 is shown in greater detail in the block diagram of FIG. 5, and includes a city block distance calcutator 120, a comparator 121, a minimum distance register 122, an address counter 123, a controller 124, and a label register 125, and stores the reference patterns in file 110 in a side-by-side fashion.

The controller 124 is initiated in comformity with the frame period, and executes the following three kinds of settings:

(1) Setting of address counter 123 at "0",
(2) Setting of label register 125 at "0", and
(3) Setting of minimum distance register 122 at a maximum value.

The maximum value mentioned above is a theoretical maximum value or a value exceeding this theoretical maximum value of the city block distance as calculated in accordance with formula (1). The content "0" of the address counter 123 is supplied to the reference pattern file 110 as the address information. The reference pattern file 110 outputs a reference pattern data $\Theta_0^s$ and $\rho_0^s$ to the city block distance calculator 120, which is supplied with the data $\Theta^k$ and $\rho^k$ calculated from the formant frequencies analyzed by the spherical coordinate converter 107. The calculator 120 calculates the city block distance $d_{0k}$ in accordance with a formula (2) which will be mentioned later. The computation of the city block distance is performed in a manner which will be explained hereinunder.

Figure 6:
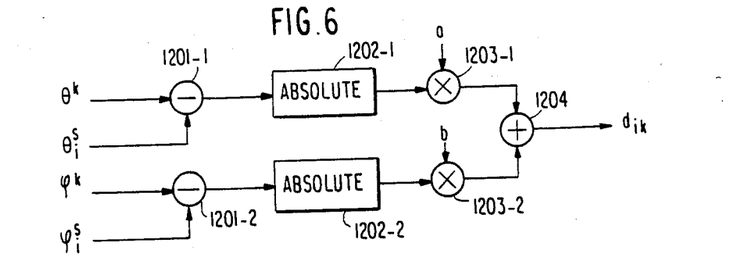
FIG. 6 is a block diagram showing the construction of a city block distance calculator 120 shown in FIG. 5.

FIG. 6 is a block diagram showing a practical construction of the city block distance calculator 120, which block is composed of subtractors 1201-1 and 1201-2, absolute value computers 1202-1 and 1202-2, multipliers 1203-1 and 1203-2, and an adder 1204. It is assumed that the multipliers 1203-1 and 1203-2 do not exist for the sake of convenient explanation. Thus, the subtractors 1201-1 and 1201-2 calculate $\Theta_0^s - \rho_0^k$ and $|\rho_0^s - \rho_0^k|$ which are delivered to the absolute value calcuators 1202-1 and 1202-2. The latter are adapted to calculate the absolute values $|\Theta_0^s - \Theta^k|$ and $|\rho_0^s - \rho^k|$ and deliver these to the adder 1204, whose output is $d_{0k}$ as expressed by the following formula:

$$d_{0k} = |\Theta_0^s - \Theta^k| + |\rho_0^s - \rho^k| \quad (2)$$

Needess to say, it is possible to impart acoustic weights to the angles $\Theta$ and $\rho$ in formula (2) if experience with the system indicates that one term has a greater influence on the auditory senses than the other term. Representing the weight coefficients by a and b, the distance is calculated in accordance with the following formula in place of formula (2) above:

$$d_{0k} = a|\Theta_0^s - \Theta^k| + b|\rho_0^s - \rho^k| \quad (3)$$

The calculation in accordance with formula (3) is executed by a circuit which has multipliers 1203-1 and 1203-2 as shown in FIG. 6.

Figure 7:
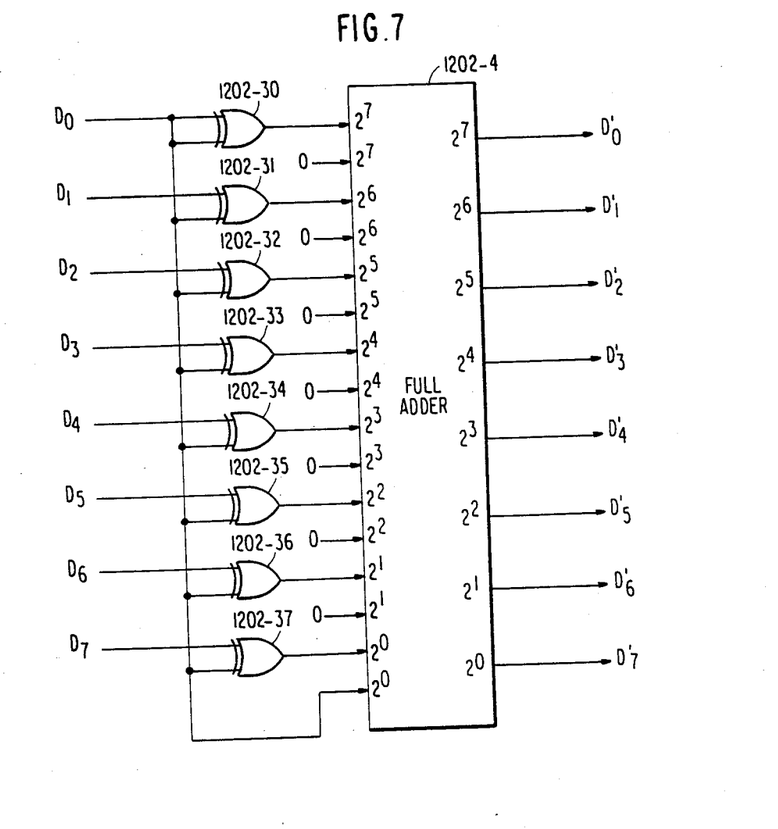
FIG. 7 is a block diagram showing the construction of the absolute value calculator 1202 shown in FIG. 6.

FIG. 7 is a block diagram of an absolute value calculator such as 1202-1 or -2, constituted by exclusive OR circuits 1202-30 to 1202-37 and a full adder 1202-4. Pieces of a 8-bit data $D_0 D_7$ are connected to one of the input terminals of the exclusive OR circuits 1202-30 to 1202-37, and the data $D_0$ is connected to their other input terminals. The data $D_0$ to $D_7$ are the data expressed by two complementary numbers which employ $D_0$ and $D_7$ as MSB and LSB. More specifically, conditions of $D_0 = 1$ and $D_o = o$ are met, respectively, when the data is negative and when the data is positive or zero. The output from the exclusive OR inverts the input $D_0$ and $D_7$ on condition of $D_0 = 1$, and conforms with the input on condition of $D_0 = 0$. These outputs are delivered to one of the input terminals $2^7$ to $2^1$ receive "0" and the other input terminal of $2^0$ receives $D_0$. Consequently, the outputs $D_0'$ to $D_7'$ coincide with $D_0$ to $D_7$ when $D_0 = 0$, whereas when $D_0 = 1$ the respective bits of $D_0$ to $D_7$ are inverted and the output of the adder 1202-4 is obtained by adding "1" to the inverted bits. Thus, a known complementary calculation method is performed in such a manner that, when the input data is negative, the output data is a complement thereof.

Referring back to FIG. 5, the city block distance $d_{0k}$ calculated at 120 is delivered to the comparator 121 and the minimum distance register 122. As explained before, the minimum distance register 122 beforehand stores the maxiuumum value which is delivered to the comparator 121.

The comparator 121 compares this maximum value with $d_{0k}$ and, if $d_{0k}$ is smaller, it delivers a control signal to the controller 124. Upon receipt of this signal, the controller 124 outputs the memory instructions to the minimum distance register 122 and the label register 125. The minimum distance register stores, in place of the "maximum value", in response to the address information "0". Subsequently, the controller 124 delivers a count-up instruction to the address counter 123. In response thereto the address counter is incremented by "1", and outputs $0 + 1 = 1$ to the reference pattern file 110. The file delivers reference patterns $\Theta_1^s$ and $\rho_1^s$ to the city block distance calculator 120, which calculates $d_{1k}$ as in the case of $d_{0k}$, and delivers it to the comparator 121 and three minimum distance register 122. The comparator 121 compares the value $d_{1k}$ with the value $d_{0k}$ supplied from the minmum distance register 122. If $d_{0k} < d_{1k}$, a control signal is delivered to the controller 124, so that the minimum distance register 122 and the label register 125 are not changed. On the other hand, when $d_{0k} > d_{1k}$, a control signal is delivered to the controller 124, so that the minimum distance register 122 and the label register 125 store, respectively, the values $d_{1k}$ and "1", respectively. As the address counter is incremented through 0, 1, . . . , j (J < n−1−, the value $d^{(j)}$ expressed by the following formula is finally written:

$$d^{(j)} = \min(d_{0k}, d_{1k} \ldots d_{(j-1)k}, d_{jk}) \quad (4)$$

the label register 125 stores the label which has been determined by formula (4).

When the condition of $k = n − 1$ is obtained, the necessary label has been written in the register 125, and is outputted to the multiplexer 111.

Referencing to FIG. 1 again, it will be understood from the foregoing description that the pattern comparison is conducted in a manner to minmize the value $d_{ok}$. This means that the selected reference pattern exhibits the formant frequency ratio $f_1:f_2:f_3$ which approximates the ratio of the input signal most closely.

It is to be noted that, since the frequencies used are the first to third formant frequencies the distribution who ratio involves an extremely small difference between speakers, it is possible to conduct the pattern comparison of the speech pattern inputted by any person with the reference patterns as easily as the pattern comparison between the input pattern by an identified speaker and the reference patterns.

As explained before, it is extremely difficult to derive reference patterns which can adapt well to any speaker since different speakers have different spectral distributions. In order to eliminate the individual-dependency of the spectral distribution, it is necessary that the length of the vocal tract and the characteristics of the vocal cord sound source are independently normalized by a suitable measure or, alternatively, by eliminating the individual differences. A pattern matching which adapts well to any speaker can thus be carried out by eliminating the differences or individual-dependency of the spectral distributions. The present invention makes use of this fact by normalizing the length of the vocal tract through the angle information Θ, ρ concerning the first to third formant freqencies expressed in terms of their spherical coordinates, and by using the ratio between such frequencies to represent the spectral envelope, whereby the individual-dependency of the vocal cord sound source characteristics is eliminated almost perfectly, thus enabling a pattern matching to be easily adapted to any speaker.

The multiplexer 111 codes the thus formed data in accordance with a predetermined format, and conducts multiplication of the coded data. The multiplied data is transmitted from the multiplexer 111 to the synthesizing section 2 through a transmission line 111.

Figure 2:
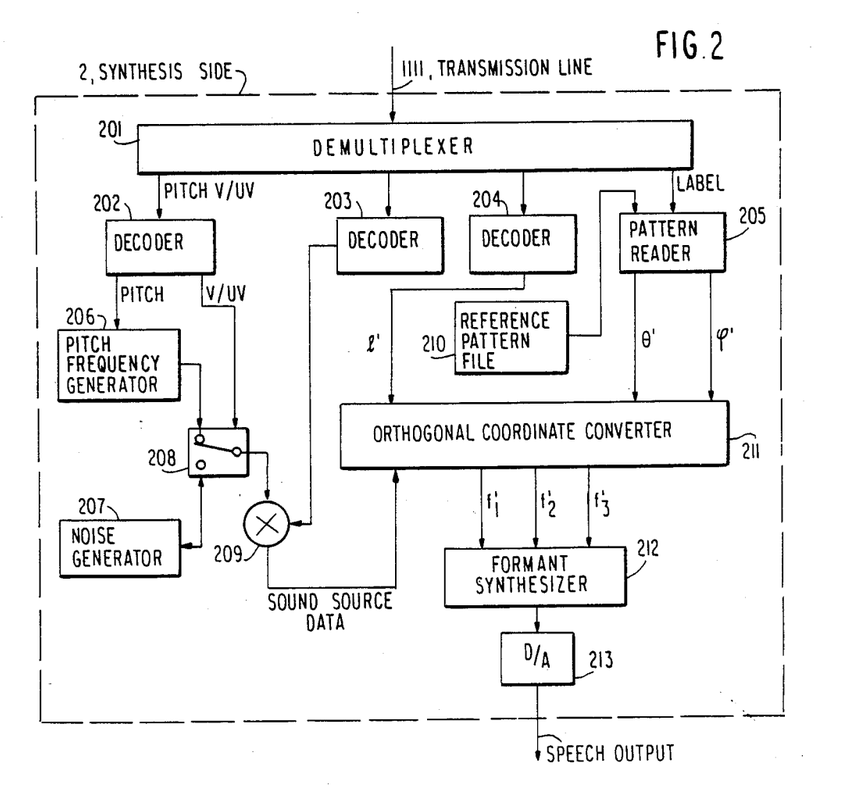
FIG. 2 is a block diagram of an example of the synthesizing section of the vocoder.

In the synthesizing section the received multiplexed signal is demultiplexed and divided into separate signals by a demultiplexer 201. The pitch V/UV data and the short-time mean power data are delivered to the decorders 202 and 203, respectively, whereas the l' data and the pattern label data are transmitted to the decoder 204 and the pattern reader 205, respectively.

The pitch information decoder by the decoder 202 is supplied to the pitch frequency generator 206 which in turn generates a pitch frequency signal corresponding to the pitch frequency.

The change-over device 208 is adapted to supply the output from the pitch frequency generator 206 to the multiplier 209 when the supplied V/UV information indicates V, i.e., the fact that there is a voice input, whereas, when the V/UV information indicates UV (voiceless), the change-over device 208 switches to deliver a noise signal from the noise generator 207 to the multiplier 209.

The multiplier 209 also receives the output from the decoder 203, i.e., the decoder short-time mean power. These two inputs are multiplied to form a model of the sound source data which in turn is supplied to the formant synthesizer 212.

The "l" data is delivered by the decoder 204 to the coordinate converter 211 as the decoder data l'.

The pattern reader 205 reads the reference pattern from the reference pattern file 210 in accordance with the pattern label data inputted thereto. This reference pattern constituted by Θ' and ρ' reference is that which most closely approximates the input Θ and ρ data.

The reference pattern file content is almost the same as that of the reference pattern file 110 of the analyzing section 1, and is adapted to supply, through the pattern reader 205, the orthogonal coordinate converter 211 with the angular information Θ' and ρ' of the reference pattern corresponding to th label appointed by the pattern reader 205.

The orthogonal coordinate converter 211 converts the received spherical coordinate data into orthogonal coordinate data, thus forming formant frequencies of $f_1'$, $f_2'$, $f_3'$, and supplies them to the formant synthesizer 212 which imparts predetermined band widths to them. These band widths are suitably selected in accordance with past experience concerning the usual formant frequency ranges.

Several methods are available for synthesizing the formant information. From among these the present invention employs a method in which a pair of α parameters are derived from each of three pieces of formant information, and the sound source data is applied to the input side of a cascade connection of three patrol-type digital filters which employ α-parameters as the filter coefficients, to thereby synthesize the formants. The digital reproduction of the input voice signal is effected as a result of the formant synthesis, and the resulting digital signal is inputted to the D/A converter 213.

The D/A converter converts the received digital signal into an analog signal and delivers it as the output voice signal after removal of unnecessary high-frequencies.

A basic feature of the present invention is that the reference pattern file provided in each of the analyzing and synthesizing sections has vector elements constituted by two pieces of angular information derived from first to third formant frequencies expressed in terms of spherical coordinates, the formant frequencies being obtained through analysis of the input speech signal.

The embodiment shown in FIGS. 1 and 2 can be modified in various ways. For instance, although in the described embodiment the first to third formant frequencies are expressed by independently setting the center frequencies and the distribution ranges, they may be expressed in the polar coordinate system such that the lower limit frequencies of the three distribution regions are normalized at the point of origin of the cooridinates, thereby effecting a flattening of the quantized sensitivity.

The formant synthesis may also be conducted by an arrangement which functions substantially the same as the formant synthesizer 212 shown in FIG. 2, e.g., a formant synthesizing LSI which is commercially available.

The described embodiment employs a pitch frequency as the sound source information when there is a speech input and a model sound source which is formed by a noise signal when there is no speech input. This arrangement, however, is only illustrative and the invention does not exclude the use of other types of sound source information such as multi-pulses, without imparing the gist of inventions.

As has been described, the formant type pattern matching vocoder of the invention enables the pattern matching to be easily adapted to an unknown speaker, as well as to specified and indentified speakers, by the provision of a reference pattern file having vector elements constituted by a pair of pieces of angular information which is determined by expressing, in terms of a spherical coordinate, the first to third formant frequencies obtained through analysis of the input voice signal.

What is claimed:
1. A formant pattern matching apparatus, comprising:
 (a) first means for developing first, second and third formant frequencies $f_1$, $f_2$ and $f_3$ from an inpart speech signal;
 (b) second means for developing first and second mutual angular data of said first, second and third formant frequencies in spherical coordinates, defined by $X/\sqrt{f_1^2+f_2^2}$ and $Y/\sqrt{f_1^2+f_2^2+f_3^2}$, re- spectively, where X is $f_1$ or $f_2$ and Y is one of $f_1$, $f_2$ and $f_3$;

(c) third means for storing third and fourth mutual angular data, defined as in (b) above, of the first, second and third formant frequencies of previously prepared speech signals; and (d) fourth means for comparing said first and second mutual angular data developed by said second means with said third and fourth mutual angular data stored in said third means, respectively, to select from data stored in said third means two angular data having a minimum distance from said first and second mutual angular data developed by said second means.

2. An apparatus according to claim 1, wherein said fourth means comprises means for calculating a city block distance which is a summed value of the magnitude differences between the first and third mutual angular data and the second and fourth mutual angular data.

3. An apparatus according to claim 1, wherein said fourth means comprises means for calculating a Euclid distance which is a root value of a summed value of squared values of the magnitude differences between the first and second mutual angular data developed by said second means and the third and fourth mutual angular data, respectively, stored in said third means.

4. An apparatus according to claim 1, wherein said first means includes means for developing auto-correlation coefficients from said input speech signal and means for developing formant frequencies by using the developed auto-correlation coefficients.

5. An apparatus according to claim 1, further comprising fifth means for determining an absolute value of a vector comprised of said first, second and third formant frequencies obtained through the spherical coordinate conversion in said second means.

6. An apparatus according to claim 5 further comprising sixth means for developing sound source data from said input speech signal.

7. An apparatus according to claim 6, wherein said sixth means develops pitch, voice or unvoice and short-time mean power data from said input speech signal.

8. An apparatus according to claim 6, wherein said sixth means develops a train of pulses whose amplitude and mutual spacing are changeable.

9. An apparatus according to claim 6, further comprising seventh means for developing formant frequencies by using output data from fourth and fifth means.

10. A formant pattern matching apparatus, comprising:

(a) a formant extractor for extracting first, second and third formant frequencies $f_1$, $f_2$ and $f_3$ from an input speech signal;

(b) a spherical coordinate converter for developing first and second mutual angular data of said first, second and third formant frequencies in spherical coordinates, defined by $X/\sqrt{f_1^2+f_2^2}$ and $Y/\sqrt{f_1^2+f_2^2+f_3^2}$, respectively, where X is $f_1$ or $f_2$ and Y is one of $f_1$, $f_2$ and $f_3$, and for developing a magnitude value defined by $\sqrt{f_1^2+f_2^2+f_3^2}$;

(c) a sound source extractor for extracting sound source data from said input speech signal;

(d) a reference pattern memory for storing reference patterns composed of third and fourth mutual angular data, defined as in (b) above, of previously analyzed speech signals; and (e) a pattern comparator for comparing said first and second mutual angular data developed by said spherical coordinate converter with said third and fourth mutual angular data stored in said reference pattern memory, respectively, selecting a reference pattern most similar to said first and second mutual angular data, and outputting label data indicating said most similar reference pattern.

11. An apparatus according to claim 10, further comprising:

(a) a sound source generator for generating a sound source signal in accordance with said sound source data;

(b) a reference pattern reader for outputting a reference pattern specified by said label data and for converting said label data into its corresponding mutual angular data;

(c) an orthogonal coordinate converter for developing a plurality of formant frequencies by orthogonal coordinate conversion from said corresponding mutual angular data and the magnitude value developed by said spherical coordinate converter; and (d) a formant synthesizer for generating a speech output in response to the outputs of said sound source generator and said orthogonal coordinate converter.

* * * * *

UNITED STATES PATENT AND TRADEMARK OFFICE
CERTIFICATE OF CORRECTION

PATENT NO. : 4,914,702                    Page 1 of 4
DATED      : April 3, 1990
INVENTOR(S): Tetsu TAGUCHI It is certified that error appears in the above-identified patent and that said Letters Patent is hereby corrected as shown below:

| Column | Line | |
|---|---|---|
| 1 | 54 | Please delete "regarede" and insert --regarded--. |
| 2 | 3 | Please delete "sceond" and insert --second--. |
| 2 | 6 | Please delete "sherical" and insert --spherical--. |
| 2 | 40 | Please delete "conventer" and insert --converter--. |
| 2 | 41 | Please delete "11." and insert --111--. |
| 2 | 45 | Please delete "multiploier" and insert --multiplier--. |
| 3 | 12 | Please delete "extrated" and insert --extracted--. |
| 3 | 15 | Please delete "shory" and insert --short--. |

UNITED STATES PATENT AND TRADEMARK OFFICE
CERTIFICATE OF CORRECTION

PATENT NO. : 4,914,702

DATED : April 3, 1990

INVENTOR(S) : Tetsu TAGUCHI

It is certified that error appears in the above-identified patent and that said Letters Patent is hereby corrected as shown below:

| Column | Line | |
|---|---|---|
| 3 | 18 | Please delete "multplexer" and insert --multiplexer--. |
| 3 | 38 | Please delete "coineide" and insert --coincide--. |
| 3 | 40 | Please delete "ratis" and insert --ratios--. |
| 3 | 60 | Please delete "fromant" and insert --formant--. |
| 4 | 4 | Please delete "$\sqrt{f_1^2} + f_2^2$" and insert --$\sqrt{f_1^2 + f_2^2}$--. |
| 4 | 5 | Please delete "$\sqrt{f1^2} + f_2^2$" and insert --$\sqrt{f_1^2 + f_2^2}$--. |
| 4 | 6 | Please delete "$\sqrt{f_1^2} + f_2^2 + f_3^3$" and insert --$\sqrt{f_1^2 + f_2^2 + f_3^3}$ |

UNITED STATES PATENT AND TRADEMARK OFFICE
CERTIFICATE OF CORRECTION

PATENT NO. : 4,914,702
DATED : April 3, 1990
INVENTOR(S) : Tetsu TAGUCHI

It is certified that error appears in the above-identified patent and that said Letters Patent is hereby corrected as shown below:

| Column | Line | |
|---|---|---|
| 4 | 18 | After "and" insert --ρ--. |
| 4 | 18 | Please delete "peces" and insert --pieces--. |
| 4 | 57 | Please delete "coordinat" and insert --coordinate--. |
| 5 | 5 | Please delete "calcutator" and insert --calculator--. |
| 6 | 45 | Please delete "1_" and insert --1),--. |
| 6 | 63 | Please delete "who" and insert --whose--. |
| 7 | 15 | Please delete "freqencies" and insert --frequencies--. |
| 7 | 63 | Please delete "th" and insert --the--. |

UNITED STATES PATENT AND TRADEMARK OFFICE
CERTIFICATE OF CORRECTION

PATENT NO. : 4,914,702

DATED : April 3, 1990

INVENTOR(S) : Tetsu TAGUCHI

It is certified that error appears in the above-identified patent and that said Letters Patent is hereby corrected as shown below:

Column | Line
--- | ---
8 | 63 | Please delete "inpart" and insert --input--.
10 | 15 | Please delete "$\sqrt{f_1^2} + f_2^2 + f_3^2;$" and insert --$\sqrt{f_1^2 + f_2^2 + f_3^2};$--.

Signed and Sealed this

Twenty-seventh Day of August, 1991

Attest:

HARRY F. MANBECK, JR.

*Attesting Officer*     *Commissioner of Patents and Trademarks*